Patented Apr. 14, 1925.

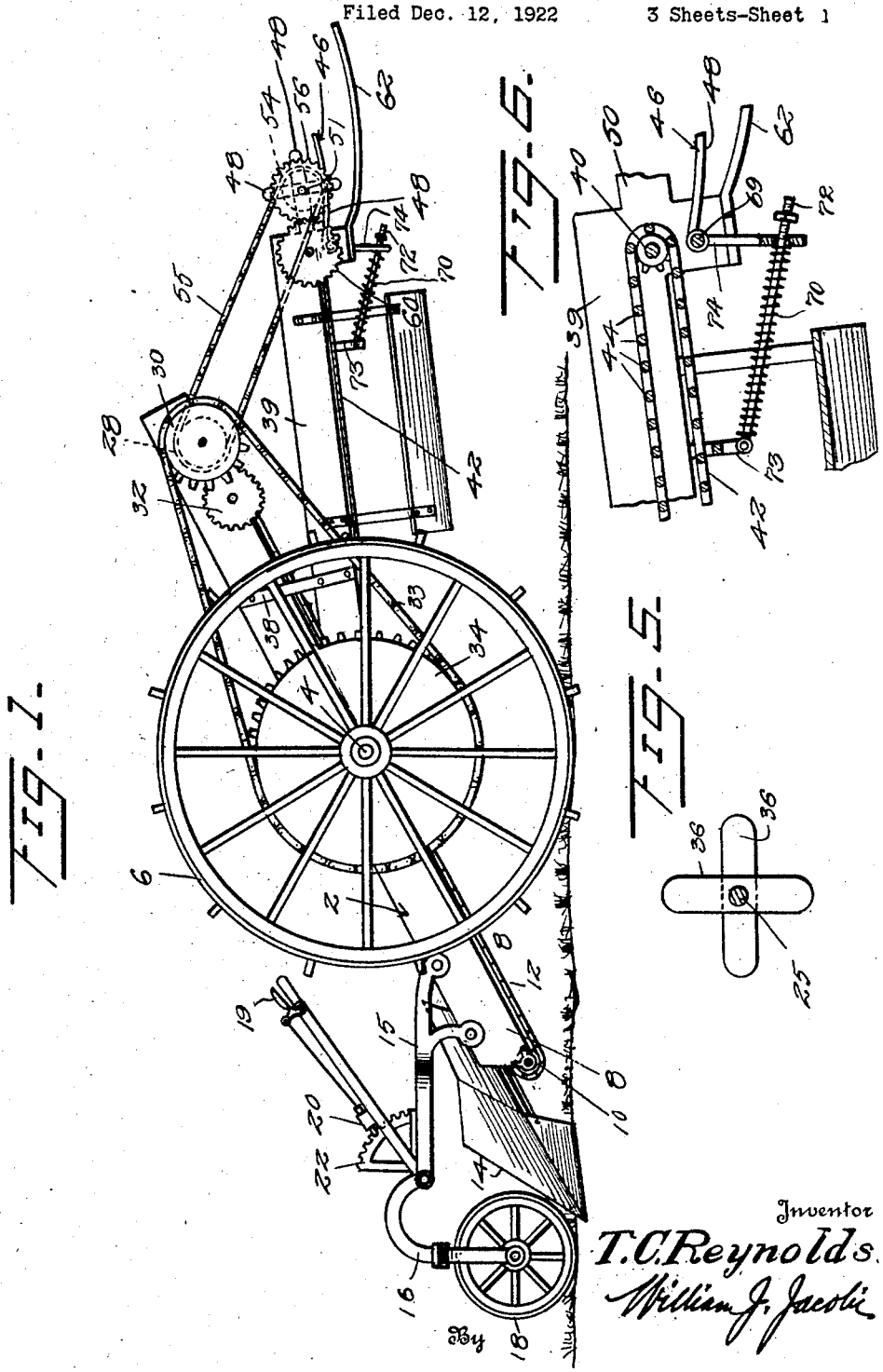

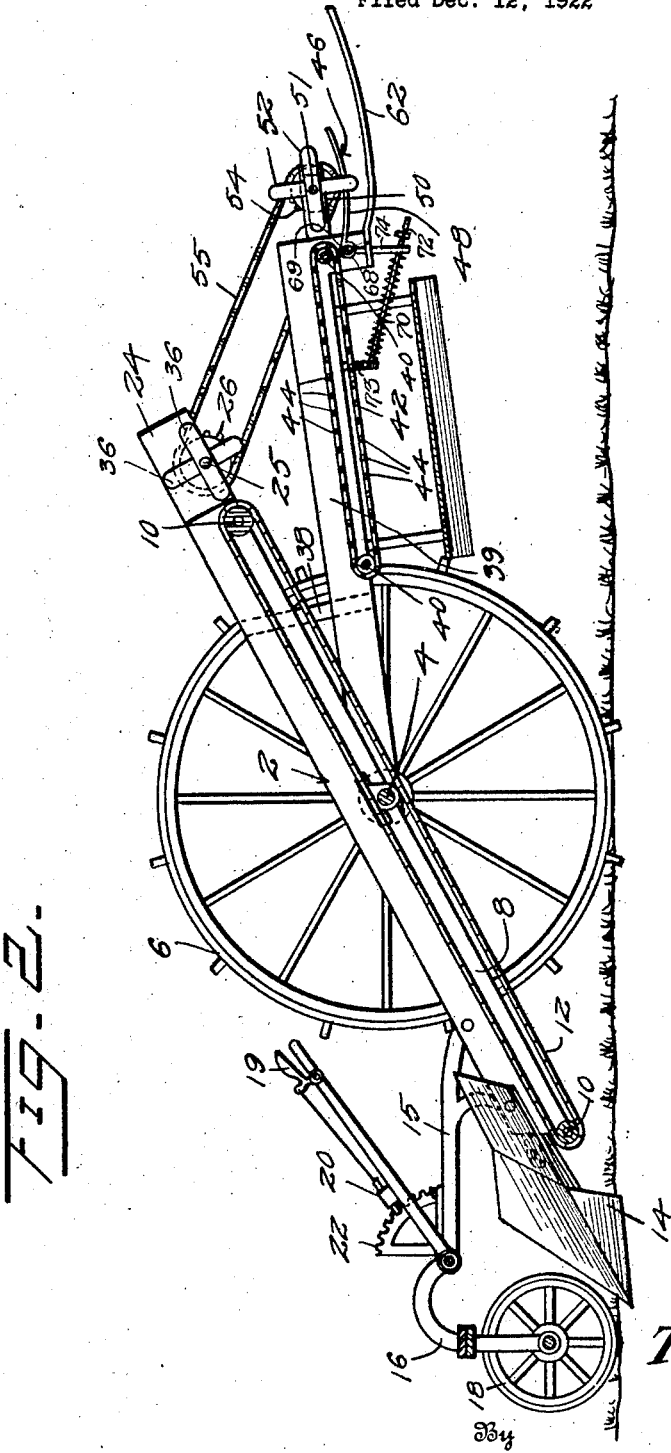

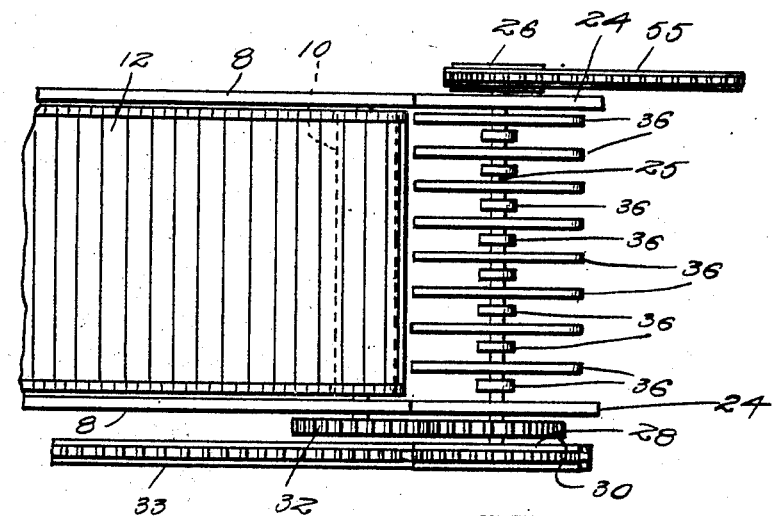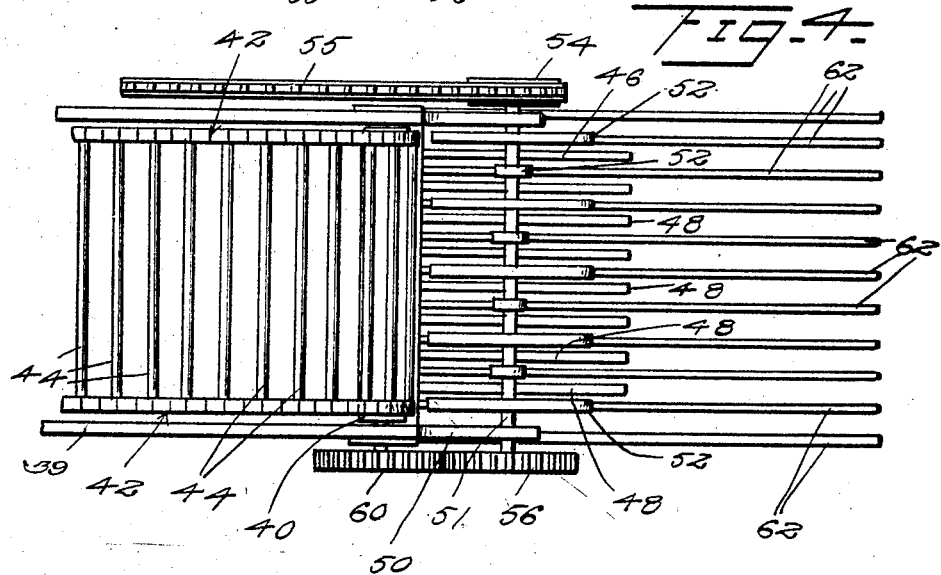

1,533,274

UNITED STATES PATENT OFFICE.

THOMAS C. REYNOLDS, OF VERDI, MINNESOTA.

QUACK-GRASS MACHINE.

Application filed December 12, 1922. Serial No. 606,425.

*To all whom it may concern:*

Be it known that THOMAS C. REYNOLDS, a citizen of the United States, residing at Verdi, in the county of Lincoln and State of Minnesota, has invented certain new and useful Improvements in Quack-Grass Machines, of which the following is a specification.

My invention relates to agricultural apparatus and particularly to a machine for cleaning the earth of what is known as quack grass roots and the like.

One of the objects of the invention is to provide a machine including in combination with a delivery or conveying apron, a vertically adjustable plow.

Another object is to provide a machine of the character with a primary and a secondary earth chopping or disintegrating device and still another object is to provide in combination with said disintegrating machine a novel conveying mechanism for feeding material thereto and a novel means for driving all of the operating elements of the machine from one driving part thereof.

Other objects and advantages of the invention will appear to those familiar with the art.

In the accompanying drawings:—

Figure 1 is a side elevation of the complete machine.

Figure 2 is a central longitudinal sectional view thereof.

Figure 3 is an enlarged detail view of the primary conveyor and its disintegrating device.

Figure 4 is an enlarged detail view of the secondary conveyor and its disintegrating device, and Figures 5 and 6 illustrate details of construction.

Referring now more particularly to the drawings by numerals of reference 2 designates the frame of the machine transversely of which is arranged the axle 4 upon the ends of which are journaled drive wheels 6. These wheels 6 are of a heavy and substantial construction and are provided with a wide circumferential tread to permit of the greatest tractive surface.

Pivotally mounted on the axle 4 between the wheels is a tiltable conveyor frame 8 in the opposite ends of which are journaled rollers 10 around which passes an endless sheet steel conveyor apron 12.

Adjacent the forward end of the conveyor frame is suitably supported a plow 14 and a steel blade which in operation are adapted to deliver the earth onto the aprons for subsequent disintegration as will be later described, and for the purpose of regulating the depth of the cut made by the plow into the ground, I provide said conveyor frame with a forwardly projecting yoke 15, the forward end of which is supported upon the arched axle 16 for the front truck wheels 18. Vertical adjustment of the plow 14 and with it the conveyor frame 8 is permitted through the actuation of a handle 19, having a locking pawl 20 cooperating with a toothed section 22.

Journaled in bars 24 rigid with and extending rearwardly from opposite sides of the conveyor frame 8, is a rotary shaft 25 to the ends of which are keyed or otherwise fixed, sprocket wheels 26 and 28. The shaft 25, further carries a fixed spur gear 30 which is in mesh with a similar gear 32 fixed on the end of the upper conveyor apron roller 10. Power to operate the shaft 25 is derived from the main drive wheels, through a sprocket chain 33 which is geared to the sprocket wheel 28 and to a relatively large sprocket wheel 34 preferably secured by suitable means to the axle shaft.

The rotary shaft 25 carries a series of beater blades 36 which are circumferentially offset from one another for the purpose of a more efficient breaking up of the clods of dirt as will be readily appreciated.

Mounted upon the machine frame below the first mentioned conveyor frame 8 and supported by braces 38, is a rearwardly and upwardly inclined second conveyor frame 39. over rollers 40 journaled in the ends of which passes an endless conveyor apron 42. which specifically comprises lateral flexible belts of suitable character to which are attached at their ends a plurality of spaced steel bars 44 upon which fall the clods of dirt after they have been chopped and broken by the previously mentioned beater blades 36.

The finer material falling upon the open apron falls between the bars onto the ground while the coarser material is carried upwardly by said apron and is delivered upon a concave 46 supported at the rear end of said second conveyor frame. It is, of course, obvious that I may provide beneath the second apron, a sheet metal plate and so arrange it that the fine dirt falling upon it will be delivered to one side of the machine. Said concave, specifically comprises a series of spaced concaved spring steel fingers 48. Journaled transversely of the concave 46 in suitable bearings 50 is a second rotary beater shaft 51 which carries a series of beater blades 52 alternating with the concave fingers 48. These blades are similar to the blades 36 and if desired may be arranged in the same manner.

To one end of the second beater shaft 51 is fixed a sprocket wheel 54 which is geared to the sprocket wheel 26 on the first beater shaft 25 through a sprocket chain 55. The opposite end of the second beater shaft carries a fixed spur gear 56 which in turn meshes with and is adapted to drive a companion gear 60 fixed on one of the upper of the open conveyor apron rollers.

The material after being finally disintegrated falls upon a carrier 62 which comprises a series of spaced tines which are supported on the open conveyor frame. The now finely divided dirt falls through the carrier onto the ground while the refuse such as grass, weeds, roots, etc. is retained on the carrier tines to be removed as desired.

The purpose of providing the concave fingers of spring steel is to permit them to yield sufficiently to enable small stones to pass through the concave when struck by the beater 52. I further provide each of the conveyor frames with side boards which prevent the material carried on the aprons from falling from the sides thereof.

The concave 46 is journaled at 68 on a transverse bar 69 and yieldingly maintained in position through the medium of a coiled compression spring 70 encircling a guide rod 72, the ends of the spring being respectively in abutting relation with a fixed stop 73 on the underside of the frame and with a depending lever 74 rigid with the concave.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

Having thus described my invention what I claim as new and desire to secure by Letters Patent is:—

1. A machine of the class described comprising a frame having traction wheels, a conveyor frame tiltably mounted on said frame, a sheet steel endless primary conveyor apron on said frame, rollers journaled in said frame for supporting said apron, a vertically adjustable plow at the receiving end of said primary apron, a rotary disintegrator at the delivery end of said primary apron, gears carried at each end of said disintegrator, a sprocket chain connected with one of said gears and with said traction wheels, a second conveyor frame supported from said machine frame below said first conveyor frame, a secondary conveyor in said second frame and comprising a series of transverse spaced metal bars, a concave having flexible steel fingers at the delivery end of said secondary apron, a rotary disintegrator cooperating with said concave, driving gearing connecting said last named disintegrator and the other of said gears on said first named disintegrator, driving gearing between said last named disintegrator and said secondary apron and a material separating carrier at the delivery end of said secondary apron.

2. In a machine of the class described, the combination with a frame, a conveyor therein, means for operating said conveyor, a concave including a plurality of spaced longitudinally extending tines, means for pivotally supporting said concave at the delivery end of said frame below the conveyor, a depending arm carried at the inner end of said concave, spring means between said arm and said frame to normally retain said concave in a yielding predetermined position, and a beater rotatably carried on said frame cooperating with said concave.

In testimony whereof I affix my signature.

THOMAS C. REYNOLDS.